Nov. 21, 1933.  B. C. KANE  1,936,560
COOKING UTENSIL
Filed Nov. 2, 1932
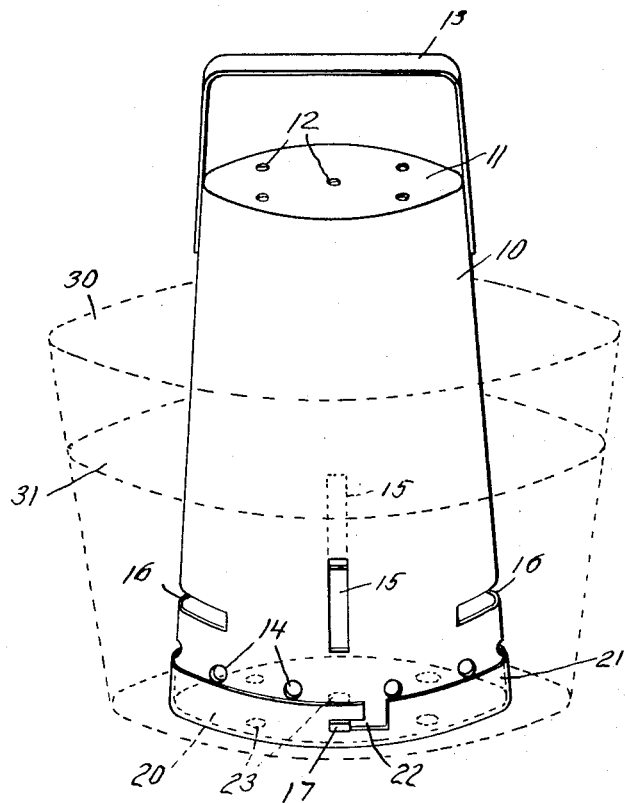
INVENTOR
Blanche C. Kane
BY
Marshall & Hawley
ATTORNEYS Patented Nov. 21, 1933

1,936,560

UNITED STATES PATENT OFFICE 1,936,560

COOKING UTENSIL

Blanche C. Kane, Darien, Conn., assignor to Norreys Products, Incorporated, New York, N. Y., a corporation of New York Application November 2, 1932. Serial No. 640,780

6 Claims. (Cl. 53—1)

This invention relates to improvements in cooking utensils, and its object is to provide a simple device which may be used for boiling and steaming simultaneously.

More particularly, its object is to provide a vessel for cooking vegetables having portions of unlike consistencies which require different degrees of cooking.

Other objects are to provide a device which will retain the vegetable cooked in it in desired position, and which may be easily manipulated. My device is especially designed for cooking asparagus, but is in no sense limited to this specific use.

It is well known that the comparatively dense stalks of asparagus require a greater amount of cooking than do the tenderer tops of the plants, consequently, if asparagus is cooked sufficiently to render the stalks tender and edible, the tops are overcooked, lose their freshness and much of their flavor. Conversely, if the cooking is only sufficient to render the tops most palatable, the stalks remain tough and unusable. The particular object of my invention is to provide a cooking utensil which will overcome this difficulty.

I will describe my invention in the following specification and point out its novel features in appended claims.

The drawing is a perspective view of a cooking utensil which is made according to and embodies my invention.

This comprises a hollow body member 10, preferably tapered as shown. This is closed at the top by a plate 11 which is permanently affixed to the upper end of the body. 12 designates a plurality of small perforations in the top plate 11. A bail or handle 13 is also provided on the upper end of the body. This bail or handle is preferably a rigid member rigidly affixed to the body for a purpose which will appear hereinafter.

Near the base of the body member are a plurality of holes 14, in this case circumferentially disposed and equally spaced apart. 15, 15 designate a pair of diametrically opposed vertical slots in the lower part of the body member, between which are two horizontal slots 16, 16.

Parts of the lower edge of the body 10 are bent outwardly to form locking lugs, one of which is shown at 17.

The device also comprises a base 20 provided with an upturned flange 21 which fits over the lower edge of the body 10. Bayonet slots 22 are formed in flange 21 to receive the locking lugs 17. A plurality of holes 23 are provided in the base 20.

In use, a bunch of asparagus is placed within the body member 10 to which the base 20 is applied and locked. The asparagus may be tied together or not, as desired. The tapered form of the body tends to maintain the asparagus in its original shape. The device is then placed in a vessel 30, shown in dotted lines in the drawing, and the latter is filled with water up to a level, indicated at 31, which is sufficiently high to cover the holes and slots in the body member. The water is then boiled. The stalks or stems of the asparagus are submerged in the water so that they are subjected to the more active effect of the boiling water than are the tops of the plants. The latter are cooked by the steam which rises in the inside of the body, some of which escapes through the vents 12.

The slots 15 and 16 are provided for the insertion of a fork by means of which it may be ascertained when the stalks have been boiled enough to render them tender. By the time the stalks are done, the tops will be sufficiently cooked without agitation and will not have lost their flavor or shape.

The device may now be lifted out of the vessel 30 and the water in it will drain off through the perforations in the base 20 and in the lower part of the body member 10. Now the utensil may be held in a nearly horizontal position by means of the rigidity of the bail 13, the base removed and the contents laid out on a flat dish without disturbing the shape of the individual shoots or of the bunch of plants no matter to what degree of tenderness they have been cooked.

I have described which I now consider a preferred form of construction, but am aware of the fact that variations of form and construction may be used within the spirit and scope of my invention and I intend no limitations other than those imposed in the appended claims.

The device is described as a cooking utensil but it is also capable of being used as a sterilizer.

What I claim is:

1. A cooking utensil comprising a hollow body member, a plate closing the top, said plate being provided with vents, a bail over the top of said body member, a perforate base, means for removably attaching the base to the lower end of the body portion, said base and the lower portion of the body portion being perforated.

2. A cooking utensil comprising a hollow body member, a plate closing the top, said plate being provided with vents, a bail rigidly affixed to the upper end of said body member, a perforate base, means for removably attaching the base to the lower end of the body portion, said base and the lower portion of the body portion being perforated.

3. A cooking utensil comprising a hollow body member, a plate closing the top, said plate being provided with vents, a bail over the top of said body member, locking lugs projecting from the lower end of said body member, and a perforate base having an upturned flange adapted to fit the lower end of the body portion, said flange being provided with bayonet slots, said base and the lower portion of the body portion being perforated.

4. A cooking utensil comprising a hollow body member, a plate closing the top, said plate being provided with vents, a bail rigidly affixed to the upper end of said body member, locking lugs projecting from the lower end of said body member, and a perforate base having an upturned flange adapted to fit the lower end of the body portion, said flange being provided with bayonet slots, said base and the lower portion of the body portion being perforated.

5. A cooking utensil comprising a hollow tapered body member, a plate closing the top, said plate being provided with vents, a bail over the top of said body member, a perforate base, means for removably attaching the base to the lower end of the body portion, said base and the lower portion of the body portion being perforated.

6. A cooking utensil comprising a hollow circular tapered body member, a plate closing the top, said plate being provided with vents, a bail rigidly affixed to the upper end of said body member, locking lugs projecting from the lower end of said body member, and a perforate base having an upturned flange adapted to fit the lower end of the body portion, said flange being provided with bayonet slots, said base and the lower portion of the body portion being perforated.

BLANCHE C. KANE.